(12) United States Patent
Holzman

(10) Patent No.: US 9,229,506 B1
(45) Date of Patent: Jan. 5, 2016

(54) DYNAMIC POWER REGULATION

(71) Applicant: Marvell Israel (M.I.S.L) Ltd., Yokneam (IL)

(72) Inventor: Uri Holzman, Kfar-Saba (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 337 days.

(21) Appl. No.: 13/847,920

(22) Filed: Mar. 20, 2013

Related U.S. Application Data

(60) Provisional application No. 61/613,621, filed on Mar. 21, 2012, provisional application No. 61/613,593, filed on Mar. 21, 2012.

(51) Int. Cl.
*G06F 1/00* (2006.01)
*G06F 1/26* (2006.01)
*G06F 1/32* (2006.01)

(52) U.S. Cl.
CPC .......................................... *G06F 1/26* (2013.01)

(58) Field of Classification Search
CPC .......................................................... G06F 1/26

USPC .................................. 713/300, 320, 322, 340
See application file for complete search history.

(56) References Cited

U.S. PATENT DOCUMENTS

| | | | |
|---|---|---|---|
| 5,907,295 A * | 5/1999 | Lin | 341/61 |
| 6,629,256 B1 * | 9/2003 | Ilan et al. | 713/501 |
| 7,932,768 B2 | 4/2011 | Bourstein et al. | |
| 8,886,979 B2 * | 11/2014 | Safford et al. | 713/320 |
| 8,924,749 B2 * | 12/2014 | Intrater | 713/320 |
| 2003/0037270 A1 * | 2/2003 | Venkitakrishnan | 713/320 |
| 2006/0212725 A1 * | 9/2006 | Kark et al. | 713/300 |
| 2007/0050646 A1 * | 3/2007 | Conroy et al. | 713/300 |
| 2008/0189561 A1 * | 8/2008 | Singh | 713/300 |
| 2008/0294924 A1 * | 11/2008 | Morrell | 713/340 |
| 2009/0164827 A1 * | 6/2009 | Komninakis et al. | 713/500 |
| 2011/0161708 A1 * | 6/2011 | DuBose | 713/323 |
| 2011/0221492 A1 * | 9/2011 | Mactaggart | 327/156 |

* cited by examiner

*Primary Examiner* — Mark Connolly

(57) ABSTRACT

Aspects of the disclosure provide an integrated circuit (IC) chip. The IC chip includes a power demand determination unit upstream of a command execution circuit. The power demand determination unit is configured to determine, before command execution, an expected power demand of the IC chip for executing a command that is input to the command execution circuit.

18 Claims, 5 Drawing Sheets

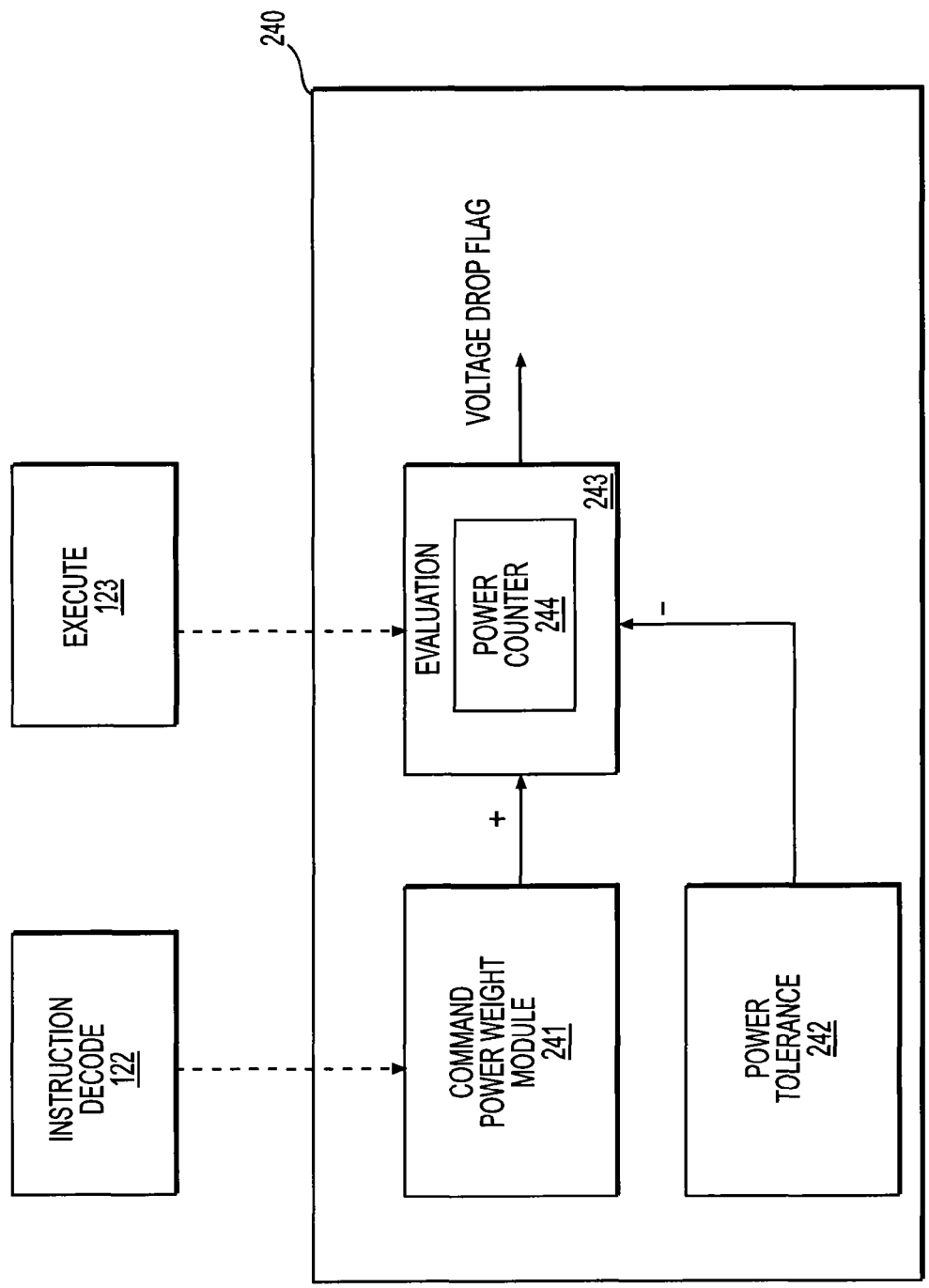

DYNAMIC POWER REGULATION

INCORPORATION BY REFERENCE

This present disclosure claims the benefit of U.S. Provisional Application No. 61/613,593, "Dynamic Power Regulation Detecting Power Drop" filed on Mar. 21, 2012, and U.S. Provisional Application No. 61/613,621, "Dynamic Power Regulation Using Activity Regulator" filed on Mar. 21, 2012. The entire disclosures of the above-identified applications are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, an electronic device receives a power supply in the form of a supply voltage from a power regulator that is external to the electronic device. Generally, the power regulator needs a time to adapt to a power demand change of the electronic device, and the electronic device is designed to operable when the supply voltage is within a specified range.

SUMMARY

Aspects of the disclosure provide an integrated circuit (IC) chip. The IC chip includes a power demand determination unit upstream of a command execution circuit. The power demand determination unit is configured to determine, before command execution, an expected power demand of the IC chip for executing a command that is input to the command execution circuit.

In an embodiment, the power demand determination unit is configured to determine, before command execution, the expected power demand of the command execution circuit for executing the command.

According to an aspect of the disclosure, the IC chip includes a central processing unit (CPU) having a plurality of processing stages formed in a pipeline for command processing. The command execution circuit is one of the processing stages. In an embodiment, the power demand determination unit is configured to determine the expected power demand based on the command input to the pipeline.

In an example, the power demand determination unit includes a weight module configured to assign a predetermined power demand weight corresponding to the command that is input to the command execution circuit. Further, the power demand determination unit is configured to average a plurality of predetermined power demand weights for a stream of commands to calculate the expected power demand.

In an embodiment, the power demand determination unit includes a speed monitor configured to monitor a momentary speed of a ring oscillator that is indicative of a supply voltage change due to a power demand change.

Further, according to an aspect of the disclosure, the IC chip includes a performance scaling module configured to cause performance scaling in the command execution circuit based on the expected power demand. In an example, the performance scaling module includes a clock gating control circuit configured to generate a clock gating control signal based on the expected power demand to cause a clock signal for the command execution circuit to skip transitions in one or more clock cycles. In another example, the performance scaling module includes an instruction injection control circuit configured to generate an instruction injection control signal based on the expected power demand to cause one or more commands that have a reduced power demand to be provided to the command execution circuit.

According to another aspect of the disclosure, the IC chip includes a feedback control circuit configured to vary a feedback signal based on the expected power demand. The feedback signal is output to an external power regulator. Based on the feedback signal, the external power regulator adjusts a supply voltage provided to the IC chip.

Further, in an example, the IC chip includes a command reorder circuit configured to reorder commands to be executed by the command execution circuit based on expected power demands of the commands.

Aspects of the disclosure provide a method that includes determining an expected power demand of an integrated circuit (IC) chip for executing a command before a command execution and inputting the command into a command execution circuit on the IC chip for the command execution.

In an embodiment, to determine the expected power demand of the IC chip for executing the command before the command execution, the method includes determining the expected power demand of the command execution circuit within a pipeline formed of a plurality of processing stages for command processing.

Further, in an example, the method includes assigning a predetermined power demand weight corresponding to the command and counting based on the predetermined power demand weight to determine the expected power demand. In addition, in an example, the method includes averaging a plurality of predetermined power demand weights for a stream of commands to calculate the expected power demand.

According to an aspect of the disclosure, the method further includes gating a clock signal for the command execution circuit to skip transitions in one or more clock cycles based on the expected power demand. According to another aspect of the disclosure, the method includes providing one or more additional commands that have a reduced power demand to the command execution circuit based on the expected power demand.

Further, in an embodiment, the method includes adjusting, based on the expected power demand, a feedback signal output to an external power regulator to adjust a supply voltage provided to the IC chip. In another embodiment, the method includes reordering commands to be executed by the command execution circuit based on expected power demands of the commands.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows a block diagram of a power demand prediction module 240 according to an embodiment of the disclosure;

DETAILED DESCRIPTION OF EMBODIMENTS

Figure 1:
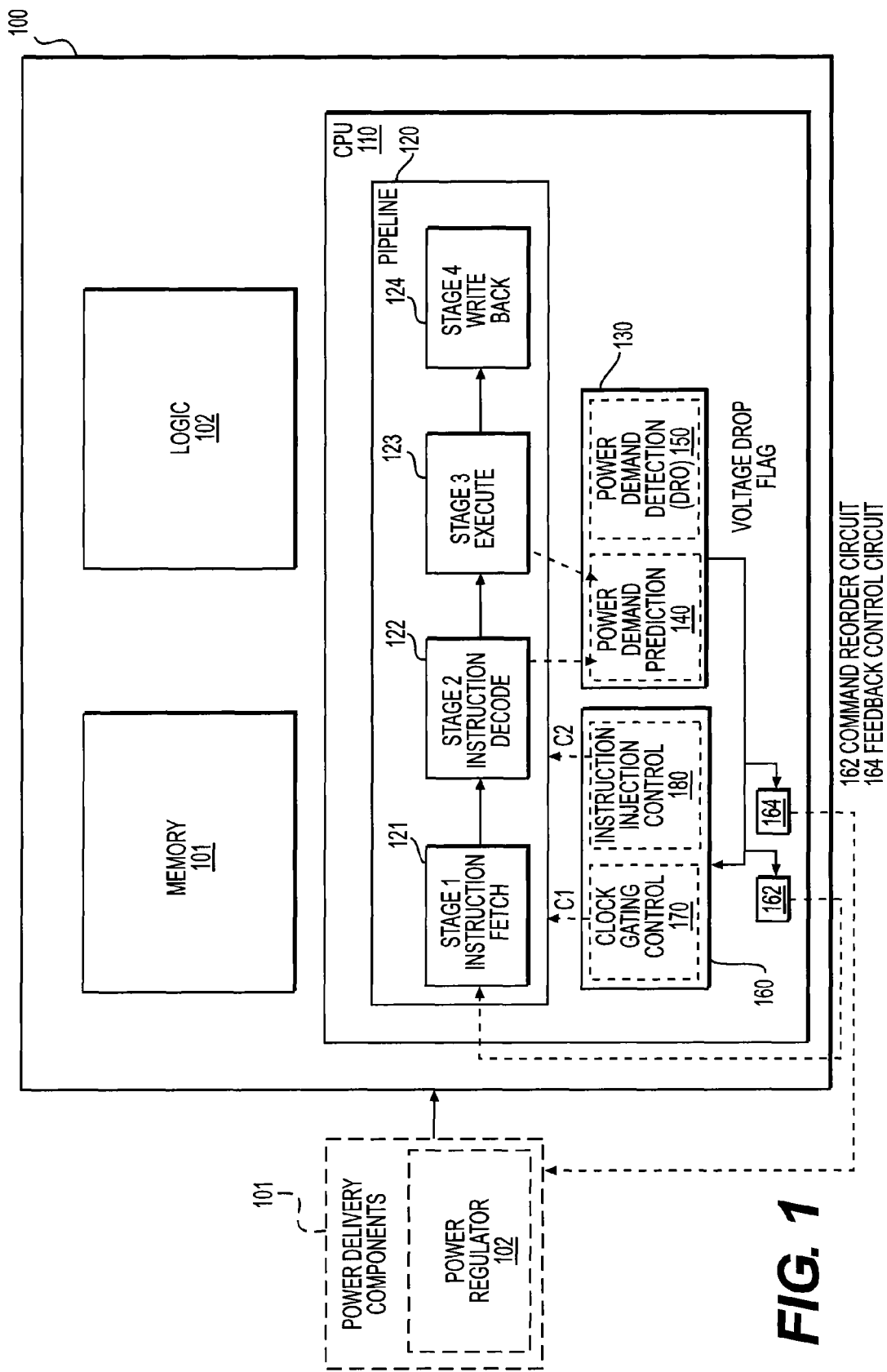
FIG. 1 shows a block diagram of an integrated circuit (IC) chip 100 according to an embodiment of the disclosure.

FIG. 1 shows a block diagram of an integrated circuit (IC) chip 100 according to an embodiment of the disclosure. The IC chip 100 includes various circuit components, such as a central processing unit (CPU) 110, a memory circuit 101, and a logic circuit 102. At least one of the circuit components on the IC chip 100, such as the CPU 110, is configured to perform dynamic power regulation in a momentary manner.

Generally, the IC chip 100 is powered by an external power regulator, in an embodiment. In an example, the IC chip 100 is assembled in an IC package that is mounted on a printed circuit board. The printed circuit board includes various power delivery components 101, such as a power regulator 102, capacitors (not shown), metal wires, and the like. The power regulator 102 provides a power supply in the form of a supply voltage to the IC package via the power delivery components 101. The IC package includes metal wires configured to direct the power supply to the IC chip 100. The IC chip 100 includes a power circuit (not shown) and a power grid (also not shown) to provide the power supply to the on chip circuit components. In an embodiment, the various metal wires can be modeled using circuit components, such as inductors, resistors, capacitors, and the like.

Generally, various circuit components on the IC chip 100 require a relatively constant supply voltage, such as a supply voltage in an acceptable range of voltages, during operation. The power regulator 102 and the power delivery components 101 are configured to maintain a relatively constant voltage supply to the IC chip 100. According to an embodiment of the disclosure, a response time of the power regulator 102 and the power delivery components 101 is in the order of milliseconds.

According to an aspect of the disclosure, the power demand of circuit components on the IC chip 100 varies. For example, the power demand of the CPU 110 is activity dependent and is based on commands being executed. In an example, the IC chip 100 is used in a media player system to decompress a high definition (HD) movie. When a user pauses the media player system, the CPU 110 receives an interrupt and waits for the interrupt to end. In an example, the CPU 110 executes no operation (NOP) commands while waiting. When the CPU 110 executes the NOP commands, the circuits in the CPU 110 do not have much switching activities, and thus the CPU 110 requires a relatively low driving current, and thus the CPU 110 has a relatively low power demand for the execution of the NOP commands.

However, in the media play system example, when the user resumes the media player system, the CPU 110 executes commands for the HD movie decompression. To execute the commands for the HD movie decompression, the circuits in the CPU 110 have heavy switching activities, and thus the CPU 110 requires a relatively large driving current, and thus the CPU 110 has a relatively large power demand for the execution of the decompression commands.

In another example, the IC chip 100 is used in a communication device to process communication traffic. The power demand of the CPU 110 changes as a function of communication traffic. For example, when the communication traffic is low, the CPU 110 has a relatively long idle time, and the power demand of the IC chip 100 is low; and when the communication traffic is high, the CPU 110 heavily operates to process the communication traffic, and has a relatively high power demand.

The variation of power demand by the circuit components on the IC chip 100 can affect the power supply to the IC chip 100. For example, when the CPU 110 switches from the NOP command executions to the decompression command executions, the power demand increases in a short time, such as in the order of picoseconds, in an example. Such sudden increase of power demand exceeds the response speed of the power regulator 102 and the power delivery components 101, in other words, the sudden increase of power demand is too fast for the power regulator 102 to respond in time. When the power regulator 102 and the power delivery components 101 cannot accommodate the sudden increase of power demand, the supply voltage to the CPU 110 may drop, causing the CPU 110 to fail.

According to an aspect of the disclosure, the CPU 110 is configured to dynamically predict or detect power demand before or at the time of command execution, and predict or detect scenarios before or at the time the sudden increase of power demand actually happen. Further, in an embodiment, when a sudden increase of power demand is predicted or detected, the CPU 110 scales down performance to slow down the increase of the power demand (e.g., reduce an increase rate), and to allow the power delivery components to have enough time to respond and accommodate the increase of the power demand and sustain a relatively constant supply voltage to the circuit components on the IC chip 100.

Alternatively, in an embodiment, before the sudden increase of power demand actually happens, the CPU 110 adjusts a feedback signal based on the predicted power demand. The feedback signal is provided to the power regulator 102 to cause the power regulator 102 to increase the supply voltage in advance of the increased power demand.

In another embodiment, the CPU 110 reorders commands before execution based on the predicted power demand of the commands to avoid sudden increase of power demand during execution.

In the FIG. 1 example, the CPU 110 includes a processing circuit 120 for instruction processing, a power demand determination unit 130, and a power demand regulation unit 160. These elements are coupled together as shown in FIG. 1.

Specifically, the processing circuit 120 includes a plurality of circuit processing stages, such as an instruction fetch stage 121, an instruction decode stage 122, an execution stage 123, a write back stage 124, and the like, coupled together and arranged in a pipeline architecture. In an example, the plurality of circuit processing stages is connected in series, so that the output of one stage is the input of the next stage. The circuit processing stages can operate in parallel to allow overlapping execution of multiple instructions with the same circuitry. Generally, the circuitry of the execution stage 123 consumes most power, and the power consumption is related to the commands executed by the execution stage 123.

The power demand determination unit 130 is configured to determine the power demand of the CPU 110 in a momentary manner. The power demand determination unit 130 can determine the power demand by prediction or detection.

In an embodiment, the power demand determination unit 130 includes a power demand prediction module 140 to predict power demand of the execution stage 123, and to predict scenarios when a voltage drop due to a sudden increase of power demand is significant, such as exceeding a voltage drop limit that may cause functional errors in the CPU 110.

In an example, the power demand prediction module 140 is coupled to the instruction decode stage 122 to track commands to be supplied to the execution stage 123 for execution. In another embodiment, the power demand prediction module 140 is coupled to the execution stage 133 to track a command executed by the execution stage 123. It is noted that the power demand prediction module 140 can be coupled with any suitable stage before the execution stage 123 to track commands to be input to the execution stage 123. In an example, the power demand prediction module 140 is coupled to an early stage in the processing circuit 120 to allow more time to predict and accommodate power demand change.

The power demand prediction module 140 calculates an indicator based on the tracked commands to indicate an increase of power demand in association with the tracked commands. The power demand prediction module 140 can use any suitable algorithm to calculate the indicator. In an example, the power demand prediction module 140 calculates a power demand by weighing each command with a corresponding power demand weight. The power demand weight corresponding to the command can be pre-defined using any suitable technique, such as theoretical determination, simulation, IC testing, and the like. Then, in an example, the power demand prediction module 140 compares the power demand of subsequent clock cycles to determine an increase of the power demand. Further, the power demand prediction module 140 compares the increase of the power demand to a power tolerance to determine whether the increase of the power demand exceeds the power tolerance that the power regulator is able to accommodate.

It is noted that, in an example, the power demand prediction module 140 determines the power demand every clock cycle. In another example, the power demand prediction module 140 uses an averaging technique to determine an average power demand over multiple clock cycles.

In another embodiment, the power demand determination unit 130 includes a power demand detection module 150 to detect a supply voltage drop due to an increase of power demand by the processing circuit 120. In the FIG. 1 example, the power demand detection module 150 includes a dynamic ring oscillator (DRO) configured to detect a ring oscillator frequency change in a momentary manner in order to detect a supply voltage drop due to a sudden increase of power demand, a suitable DRO has been disclosed in Applicant's co-pending application Ser. No. 12/707,142, filed Feb. 17, 2010, and assigned to Marvell, which is incorporated herein by reference in its entirety.

The power demand regulation module 160 is configured to generate control signals to regulate the power demand of the processing circuit 120. In an embodiment, when the power demand determination unit 130 detects a scenario that an increase of the power demand of the processing circuit 120 may cause a power regulator to fail to accommodate in time, the power demand regulation module 160 generates control signals to scale down the performance of the processing circuit 120 to reduce an increase rate of the power demand, such that the power regulator is able to respond to the increase of the power demand.

In an embodiment, the power demand regulation module 160 includes a clock gating control circuit 170 configured to generate a control signal to gate a clock signal for the processing circuit 120. In an example, when the increase of power demand is larger than the power tolerance, the control signal generated by the clock gating control circuit 170 causes the clock signal to skip transitions in one or more clock cycles, thus the processing circuit 120 takes an increased number of clock cycles to execute a set of commands.

In another embodiment, the power regulation module 160 includes an instruction injection control module 180 configured to inject relatively low power demand instructions, such as NOP instructions and the like, in the pipeline architecture. In an example, the execution of the low power demand instructions does not affect the states of the processing circuit 120, but reduce an average of power demand of the processing circuit 120, and also reduce an increase rate of the power demand of the processing circuit 120.

According to an aspect of the disclosure, the CPU 110 includes a command reorder circuit 162. The command reorder circuit 162 is configured to reorder commands before command execution based on the voltage drop flag. For example, when the voltage drop flag indicates a predicted voltage drop that may harm operations of the CPU 110, the command reorder circuit 162 reorders the commands before commands execution to avoid the predicted voltage drop.

According to another aspect of the disclosure, the CPU 110 includes a feedback control circuit 164. The feedback control circuit 164 is configured to cause a feedback signal to be adjusted based on the voltage drop flag. The feedback signal is provided to the external power regulator 102 to adjust the supply voltage to the IC chip 100. For example, when the voltage drop flag indicates a predicted voltage drop that may harm operations of the CPU 110, the feedback control circuit 164 causes the feedback signal to be adjusted in a direction to make the power regulator 102 to raise the supply voltage to the IC chip 100 in advance of the commands execution. In an embodiment, the power regulator 102 is a load adaptive loop based voltage source, such as disclosed in Applicant's co-pending patent application Ser. No. 13/468,241 filed May 10, 2012, which is incorporated herein by reference in its entirety.

According to an embodiment of the disclosure, the power regulation module 160 scales the performance of the processing circuit 120 without changing the clock frequency of the clock signal. Such performance scaling does not require changes in a phase-locked loop that generates the clock signal, and does not produce synchronization complexity. Similarly, the feedback control circuit 164 and the command reorder circuit 162 do not require clock frequency change, and do not require changes in the phase locked loop and do not produce synchronization complexity.

FIG. 2 shows a block diagram of a power demand prediction module 240 according to a particular embodiment of the disclosure. The power demand prediction module 240 can be used in the IC chip 100 as the power demand prediction module 140. The power demand prediction module 240 includes a command power weight module 241, an evaluation module 243 and a power tolerance module 242. These elements are coupled together as shown in FIG. 2.

In the embodiment, the command power weight module 241 is configured to sample commands at a front end of the execution stage 123, such as the instruction decode module 122. Further, the command power weight module 241 applies power demand weights corresponding to the sampled commands. In an example, the command power weight module 241 includes memory circuits configured to store the power demand weights corresponding to commands, such as storing a relatively small value corresponding to a NOP command and a relatively large value corresponding to a decompression command. When the sampled command is a NOP command, the command power weight module 241 applies the relatively small value as weight; and when the sampled command is a decompression command, the command power weight module 241 applies the relatively large value as weight. The applied power demand weights are provided to the evaluation module 243.

The power tolerance module 242 includes a memory circuit configured to store a value of power tolerance for a power regulator in an example.

The evaluation module 243 is configured to set or clear a voltage drop flag based on the power demand weights and the power tolerance. In an embodiment, the evaluation module 243 substrates the power tolerance from the power demand weights to evaluate the power demand. In an example, the evaluation module 243 includes a counter 244. The counter 244 is configured to count up by a value of power demand weight for a command to be executed in the execution stage 123 and count down by the value for the power tolerance. Further, when the value in the power counter 244 exceeds a threshold, the power evaluation module 243 sets the voltage drop flag to indicate a significant voltage drop that may harm the operation of the CPU 110; otherwise, the power evaluation module 243 clears the voltage drop flag.

Figure 3A:
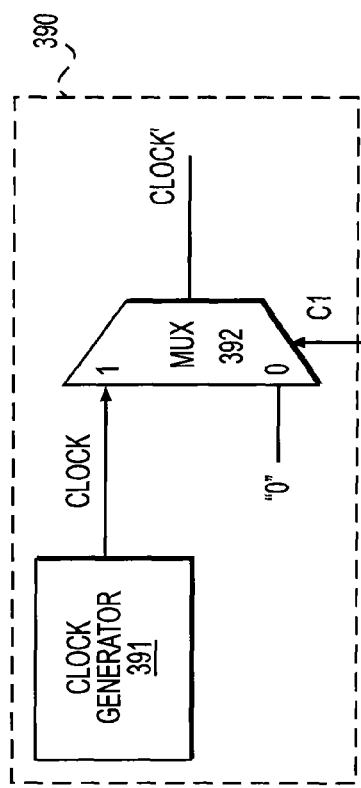
FIG. 3A shows a block diagram of a clock gating example according to an embodiment of the disclosure.

FIG. 3A shows a block diagram of a clock gating circuit 390 coupled with a clock gating control circuit 370 according to an embodiment of the disclosure. In an example, the clock gating circuit 390 is implemented on the IC chip 100 to generate a clock signal for the processing circuit 120, and the clock gating control circuit 370 is used as the clock gating control circuit 170 to generate a control signal for controlling the clock gating circuit 390. The clock gating circuit 390 includes a clock generator 391 and a multiplexer (MUX) 392. These elements are coupled together as shown in FIG. 3A.

The clock generator 391 generates a first clock signal CLOCK, and provides the first clock signal CLOCK to the MUX 392. The MUX 392 receives the first clock signal CLOCK from a first input terminal, and receives a constant low voltage corresponding to logic "0" at a second input terminal. The MUX 392 receives a select control signal C1 from the clock gating control module 370. The MUX 392 selects one of the signals received at the first and second input terminals to output a second clock signal CLOCK' at an output terminal of the MUX 392.

In an example, the clock gating control module 370 generates the select control signal C1 in the form of a sequence of binary bits that each lasts for a clock cycle. In an example, when the voltage drop flag is cleared, the clock gating control module 370 generates a sequence of logic "1" as the select control signal C1 to select the first clock signal CLOCK to pass to the output terminal of the MUX 392. Thus, the second clock signal CLOCK' is substantially the same as the first clock signal CLOCK. When the voltage drop flag is set, the clock gating control module 370 generates a sequence of mixed logic "1" and logic "0" to selectively pass logic "0" from the second input terminal to the output terminal of the MUX 392 to block transitions of the second clock signal CLOCK'.

Figure 3B:
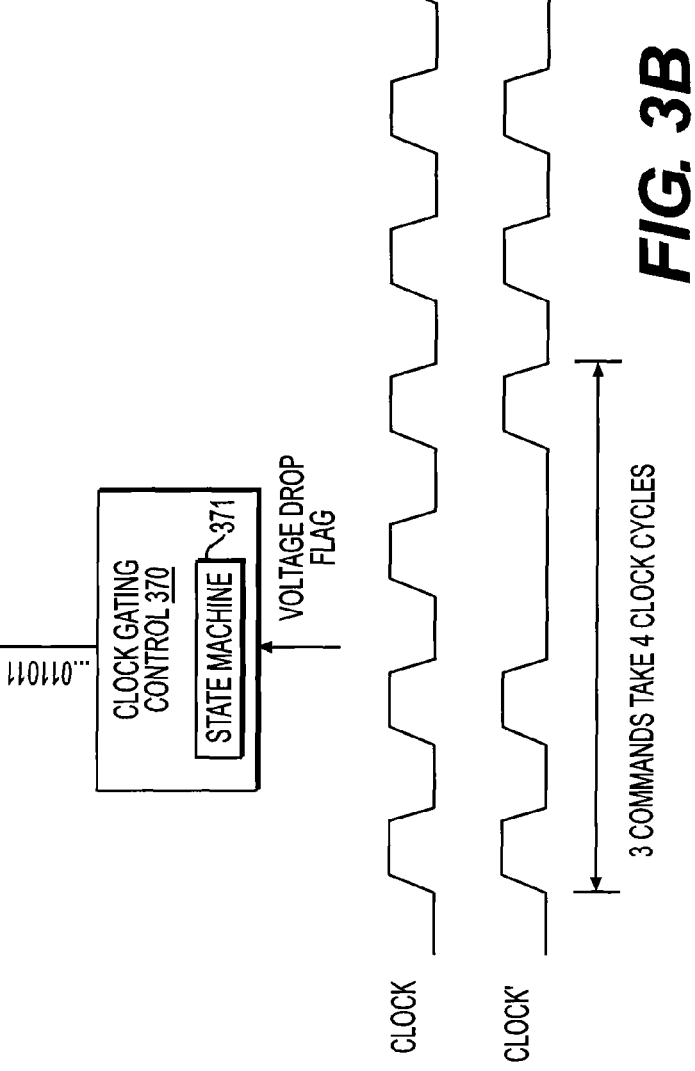
FIG. 3B shows a plot of waveforms for the clock gating example in FIG. 3A.

FIG. 3B shows a plot of waveforms for the clock gating circuit 390 in the FIG. 3A. The plot includes a first waveform 393 for the first clock signal CLOCK, and a second waveform 394 for the second clock signal CLOCK'.

In the FIG. 3B example, the second clock signal CLOCK' is blocked one of every three clock cycles. Using the second clock signal CLOCK', it takes longer time to execute a set of commands. For example, using the first clock signal CLOCK, it takes three clock cycles to execute three commands. However, using the second clock signal CLOCK', it takes four clock cycles to execute three commands, thus an average power demand per clock cycle is reduced for example by 25%.

It is noted that the clock signal for the processing circuit 120 can be generated by other suitable method, such as the method disclosed in Applicant's U.S. Pat. No. 7,932,768 issued Apr. 26, 2011, which is incorporated herein by reference in its entirety.

Figure 4:
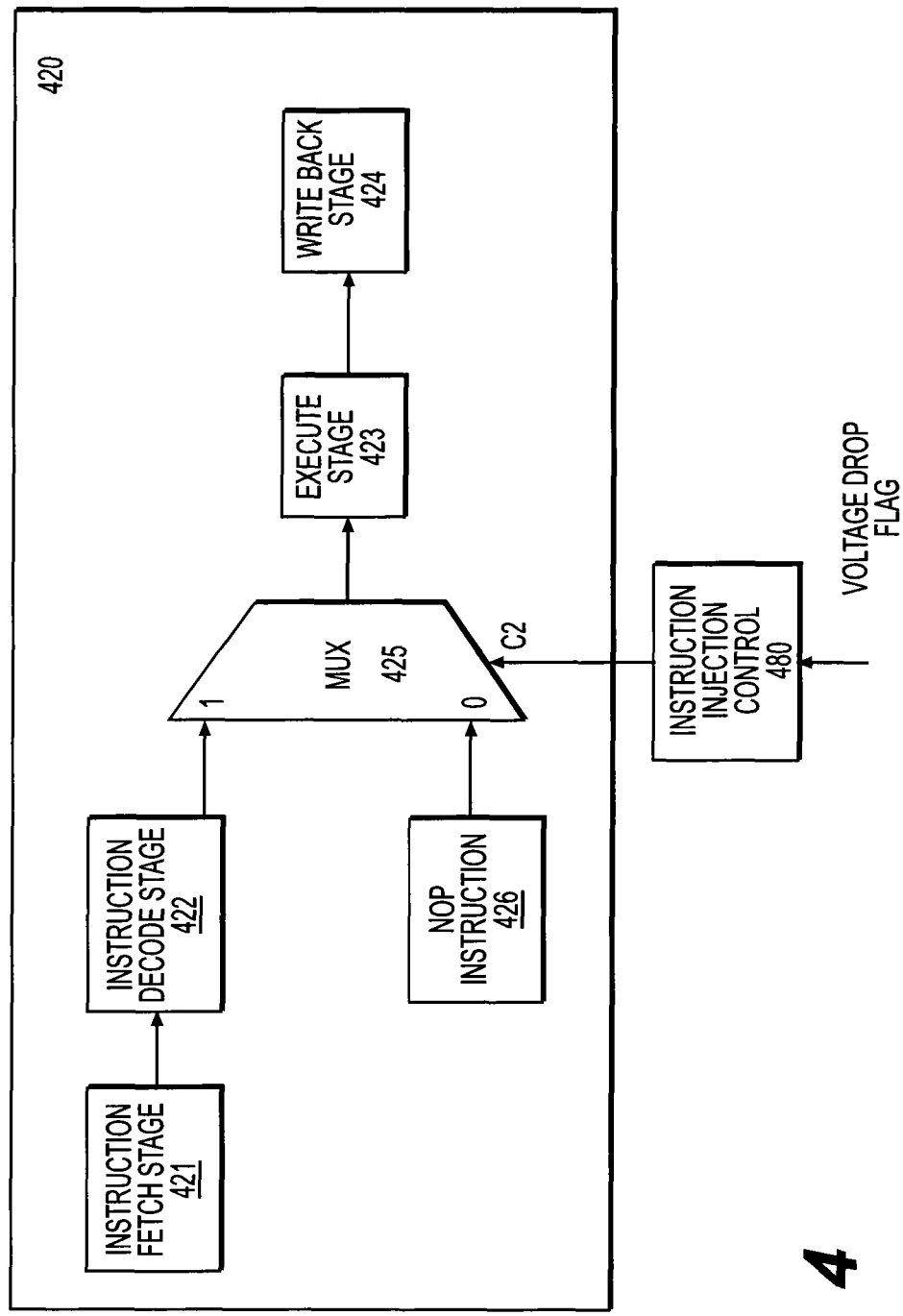
FIG. 4 shows a block diagram of a pipeline architecture example 420 according to an embodiment of the disclosure.

FIG. 4 shows a block diagram of a processing circuit 420 coupled with an instruction injection control module 480 according to an embodiment of the disclosure. The processing circuit 420 can be used in the IC chip 100 in the place of the processing circuit 120. The processing circuit 420 utilizes certain components that are identical or equivalent to those used in the processing circuit 120; the description of these components has been provided above and will be omitted here for clarity purposes. Additionally, the processing circuit 420 includes a multiplexer (MUX) 425 configured to selectively inject low power demand commands, such as NOP comments into the execute stage 423.

In the FIG. 4 example, the MUX 425 receives commands from the instruction decode module 422 at a first input terminal, and receives NOP comments at a second input terminal. The MUX 425 receives a select control signal C2 from the instruction injection control module 480. The MUX 425 selectively pass commands from the first input terminal or the second input terminal to the output terminal to provide to the execute stage 423.

In an example, the instruction injection control module 480 generates the select control signal C2 in the form of a sequence of binary bits to control the MUX 425. In an example, when the voltage drop flag is cleared, the instruction injection control module 480 generates a sequence of logic "1" as the select control signal C2 to select the commands provided from the instruction decode stage 422 to pass to the output terminal of the MUX 425. When the voltage drop flag is set, the instruction injection control module 480 generates a sequence of mixed logic "1" and logic "0" to selectively pass NOP commands from the second input terminal to the output terminal of the MUX 425. According to an embodiment of the disclosure, in response to an NOP command, circuits in an execute stage, such as the circuits in the execution stage 123, and the like, maintain their previous states, and thus do not have switching activities. The injection NOP comments can reduce an average power demand per clock cycle.

Figure 5:
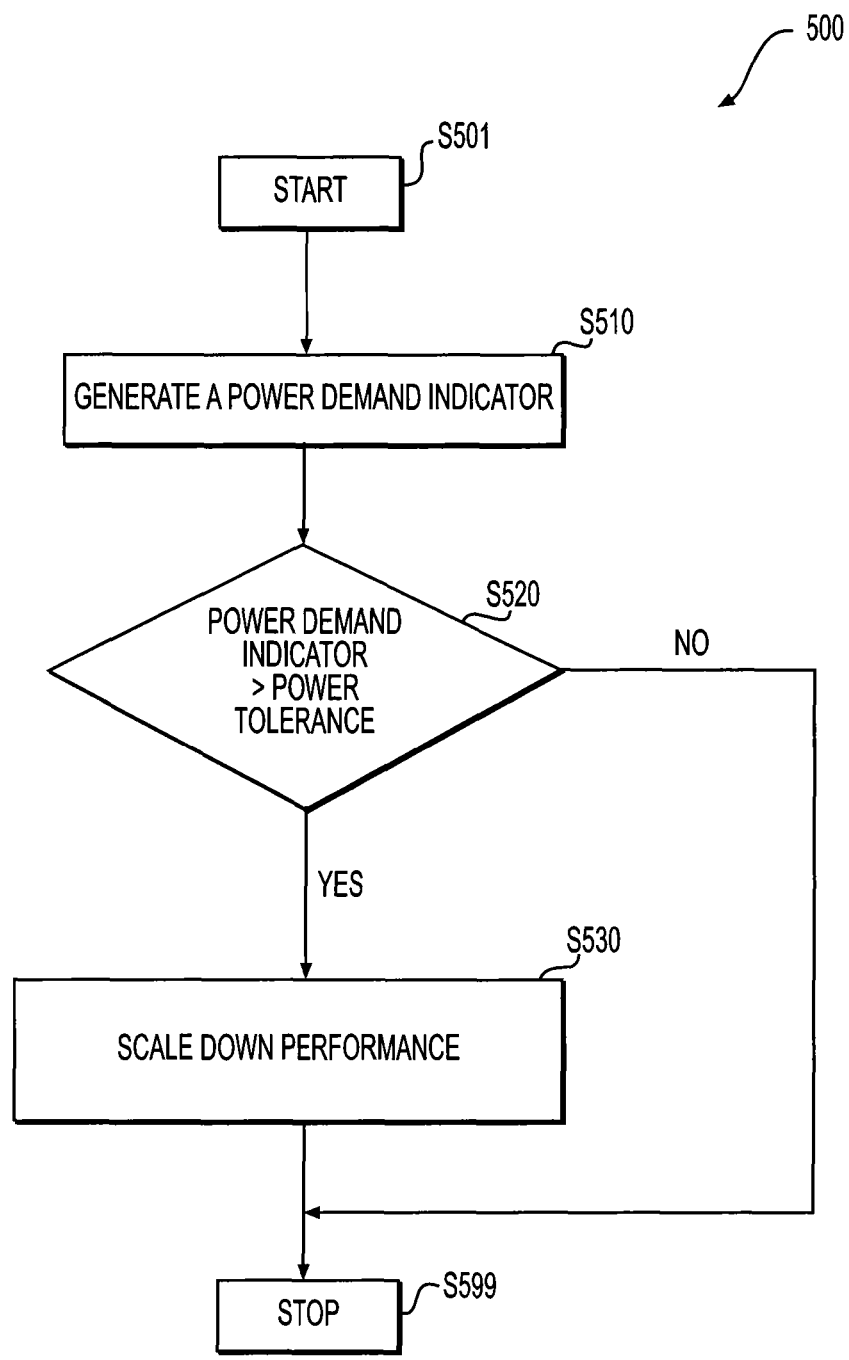
FIG. 5 shows a flow chart outlining a process example according to an embodiment of the disclosure.

FIG. 5 shows a flow chart outlining a process example 500 executed by a circuit, such as the CPU 110, according to an embodiment of the disclosure. The process starts at S501, and proceeds to S510.

At S510, a power demand indicator is generated in a momentary manner to indicate an increase of power demand. In an embodiment, the power demand indicator is generated by prediction. In an example, the CPU 110 includes the power demand prediction module 140 to track commands to be provided to the execution stage 123. Further, the power demand prediction module 140 applies power demand weights to corresponding commands, and compares the power demand of subsequent time durations, such as subsequent clock cycles, to determine an increase of the power demand as the power demand indictor.

In another example, the CPU 110 includes a momentary speed monitor configured to monitor a momentary speed due to a supply voltage change. The momentary speed can be used as the power demand indicator.

At S520, the power command indicator is compared with a power tolerance. In an example, when the power command indicator is lower than the power tolerance, the increase of power demand can be accommodated by power delivery components, and process proceeds to S599 and terminates; otherwise, the increase of power demand may cause a significant voltage drop that may harm the operations of the CPU 110, and the process proceeds to S530.

At S530, the performance of the CPU 110 is scaled down to allow the power regulator to accommodate the increase of power demand. In an example, the clock gating control circuit 170 generates a control signal to gate a clock signal for the processing circuit 120. As a result, it takes the processing circuit 120 an increased number of clock cycles to execute a set of commands.

In another embodiment, the instruction injection control module 180 injects relatively low power demand instructions, such as NOP instructions and the like, in the pipeline architecture. In an example, the execution of the low power demand instructions does not affect the states of the processing circuit 120, but reduces an average of power demand of the processing circuit 120, and also reduce an increase rate of the power demand of the processing circuit 120.

Alternatively, in an embodiment, the CPU 110 causes a feedback signal to be adjusted. The feedback signal is provided to the external power regulator 102 to increase the supply voltage to the IC chip 100 in advance of execution of the commands that can cause a significant voltage drop. Thus, at the time of the commands execution, the increase of the supply voltage compensates for the voltage drop, and thus the supply voltage does not drop to a level that harms the operations of the CPU 110.

In another embodiment, the commands are reordered before inputting to the execution stage 123 to avoid the significant voltage drop.

Then, the process proceeds to S599 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An integrated circuit (IC) chip, comprising:
a power demand determination unit upstream of a command execution circuit, the power demand determination unit configured to determine, before command execution, an expected power demand of the IC chip for executing a command that is input to the command execution circuit, and the power demand determination unit including a speed monitor configured to monitor a momentary speed of a ring oscillator that is indicative of a supply voltage change due to a power demand change.

2. The IC chip of claim 1, wherein the power demand determination unit is configured to determine, before command execution, the expected power demand of the command execution circuit for executing the command.

3. The IC chip of claim 1, further comprising:
a central processing unit (CPU) having a plurality of processing stages formed in a pipeline for command processing, and the command execution circuit being one of the processing stages.

4. The IC chip of claim 3, wherein the power demand determination unit is configured to determine the expected power demand based on the command input to the pipeline.

5. The IC chip of claim 1, wherein the power demand determination unit comprises:
a weight module configured to assign a predetermined power demand weight corresponding to the command that is input to the command execution circuit.

6. The IC chip of claim 5, wherein the power demand determination unit comprises:
a counter configured to count based on the predetermined power demand weight to determine the expected power demand.

7. The IC chip of claim 5, wherein the power demand determination unit is configured to average a plurality of predetermined power demand weights for a stream of commands to calculate the expected power demand.

8. The IC chip of claim 1, further comprising:
a performance scaling module configured to cause performance scaling in the command execution circuit based on the expected power demand.

9. The IC chip of claim 8, wherein the performance scaling module comprises:
a clock gating control circuit configured to generate a clock gating control signal based on the expected power demand to cause a clock signal for the command execution circuit to skip transitions in one or more clock cycles.

10. The IC chip of claim 8, wherein the performance scaling module comprises:
an instruction injection control circuit configured to generate an instruction injection control signal based on the expected power demand to cause one or more commands that have a reduced power demand to be provided to the command execution circuit.

11. The IC chip of claim 1, further comprising:
a feedback control circuit configured to vary a feedback signal based on the expected power demand, the feedback signal being output to an external power regulator to adjust a supply voltage provided to the IC chip.

12. The IC chip of claim 1, further comprising:
a command reorder circuit configured to reorder commands to be executed by the command execution circuit based on expected power demands of the commands.

13. A method, comprising:
determining an expected power demand of an integrated circuit (IC) chip for executing a command before a command execution by:
assigning a predetermined power demand weight corresponding to the command,
counting based on the predetermined power demand weight to determine the expected power demand, and
averaging a plurality of predetermined power demand weights for a stream of commands to calculate the expected power demand; and
inputting the command into a command execution circuit on the IC chip for the command execution.

14. The method of claim 13, wherein determining the expected power demand of the IC chip for executing the command before the command execution further comprises:
determining the expected power demand of the command execution circuit within a pipeline formed of a plurality of processing stages for command processing.

15. The method of claim 13, further comprising:
gating a clock signal for the command execution circuit to skip transitions in one or more clock cycles based on the expected power demand.

16. The method of claim 13, further comprising:
providing one or more additional commands that have a reduced power demand to the command execution circuit based on the expected power demand.

17. The method of claim 13, further comprising:
adjusting, based on the expected power demand, a feedback signal output to an external power regulator to adjust a supply voltage provided to the IC chip.

18. The method of claim 13, further comprising:
reordering commands to be executed by the command execution circuit based on expected power demands of the commands.

* * * * *